US012755316B2

(12) United States Patent
Moshe et al.

(10) Patent No.: US 12,755,316 B2
(45) Date of Patent: Oct. 6, 2026

(54) SYSTEMS AND METHODS FOR ANALYZING USER CHANCE PREDICTIONS TO DETERMINE A USER CLASSIFICATION

(71) Applicant: YAHOO ASSETS LLC, New York, NY (US)

(72) Inventors: Ran Moshe, Yaakov (IL); Dipen Rughwani, Cupertino, CA (US); Alex Shaw, New York, NY (US)

(73) Assignee: Yahoo Assets LLC, New York, NY (US)

( * ) Notice: Subject to any disclaimer, the term of this patent is extended or adjusted under 35 U.S.C. 154(b) by 204 days.

(21) Appl. No.: 18/469,874

(22) Filed: Sep. 19, 2023

(65) Prior Publication Data

US 2025/0095062 A1 Mar. 20, 2025

(51) Int. Cl.

*G06Q 30/00* (2023.01)
*G06Q 10/04* (2023.01)
*G06Q 40/04* (2012.01)

(52) U.S. Cl.

CPC ............. *G06Q 40/04* (2013.01); *G06Q 10/04* (2013.01)

(58) Field of Classification Search

CPC ...................................................... G06Q 40/04
USPC ............... 705/37, 1.1, 35, 39, 36 R, 7.31, 5; 715/781
See application file for complete search history.

(56) References Cited

U.S. PATENT DOCUMENTS

| | | | | |
|---|---|---|---|---|
| 8,583,470 B1 * | 11/2013 | Fine | ........................ | G06Q 40/04 705/7.31 |
| 2021/0056629 A1 * | 2/2021 | Foley | ...................... | G06F 16/26 |
| 2023/0050034 A1 * | 2/2023 | Ben-Elazar | ............ | G06N 20/00 |

OTHER PUBLICATIONS ip.com NPL Search History.*

* cited by examiner

*Primary Examiner* — John H. Holly
(74) *Attorney, Agent, or Firm* — Bookoff McAndrews, PLLC

(57) ABSTRACT

Systems and methods are disclosed for determining one or more chance predictions for a predictive user. One method comprises receiving a bullish threshold, a bearish threshold, and one or more time periods from at least one user, receiving a plurality of predictions from one or more prediction databases, receiving one or more basis sets, based on the plurality of predictions, determining, at least one p-score for each of the one or more time periods, calculating a null distribution of successful predictions based on the one or more basis sets and the one or more time periods, determining a prediction user p-value based on the null distribution and the at least one p-score, selecting a classification for the at least one prediction user based on the prediction user p-value, and displaying at least one graphical widget corresponding to the classification on one or more interfaces of a user device.

20 Claims, 4 Drawing Sheets

| P_VAL THRESHOLD | SIGNIFICANT (TOTAL) | NON-SIGNIFICANT (TOTAL) |
|---|---|---|
| 0.05 | 48.3% (1105) | 47.6% (62599) |
| 0.02 | 49.8% (422) | 47.6% (63282) |
| 0.01 | 55% (211) | 47.6% 63493) |
| 0.005 | 50% (106) | 47.6% 63598) |

SYSTEMS AND METHODS FOR ANALYZING USER CHANCE PREDICTIONS TO DETERMINE A USER CLASSIFICATION

TECHNICAL FIELD

The present disclosure relates generally to using a statistical computation to account for market conditions and, more particularly, to systems and methods for analyzing one or more user chance predictions to determine a user classification.

BACKGROUND

People make predictions (e.g., bets) on everything from stocks to sports. As the use of the Internet continues to grow, especially regarding social media platforms and finance-oriented platforms, people are increasingly making and discussing predictions using such platforms. For example, people may weigh in on whether they are bullish on a stock (e.g., expecting the price to go up) or bearish (e.g., expecting the price to go down). Over time, people may accumulate successes and failures at making predictions. For example, people may accumulate successes and failures at predicting stock price movements on social media platforms and/or the finance-oriented platforms. However, it is very difficult to assess a person's skill and success at making predictions. Conventional methods may include people manually researching whether a person's predictions have been successful. Additionally, conventional methods may rank people based on their predictions. However, conventional methods fail to determine whether a person successfully made a prediction due to chance or whether the person is actually skilled. Additionally, ranking people may not be accurate, as the ranking may depend on the set of people, who may change over time. As a result, people are unable to accurately determine who to follow for insight regarding a prediction.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

Embodiments of the present disclosure include systems and methods for analyzing one or more user chance predictions to determine a user classification.

According to certain embodiments, computer-implemented methods are disclosed for analyzing one or more user chance predictions to determine a user classification. One method may include receiving, by one or more processors, a bullish threshold, a bearish threshold, and one or more time periods from at least one user. The method may further include receiving, by the one or more processors, a plurality of predictions corresponding to at least one prediction user from one or more prediction databases, wherein each of the plurality of predictions includes a basis set identifier, a date, and a basis set prediction value. The method may further include receiving, by the one or more processors, one or more basis sets from one or more databases. The method may further include, based on the plurality of predictions, determining, by the one or more processors, at least one p-score for each of the one or more time periods. The method may further include calculating, by the one or more processors, a null distribution of successful predictions based on the one or more basis sets and the one or more time periods. The method may further include determining, by the one or more processors, a prediction user p-value based on the null distribution and the at least one p-score. The method may further include selecting, by the one or more processors, a classification for the at least one prediction user based on the prediction user p-value. The method may further include displaying, by the one or more processors, at least one graphical widget corresponding to the classification on one or more interfaces of a user device.

According to certain embodiments, a computer system for analyzing one or more user chance predictions to determine a user classification is disclosed. The computer system may comprise a memory having processor-readable instructions stored therein, and one or more processors configured to access the memory and execute the processor-readable instructions, which when executed by the one or more processors configures the one or more processors to perform a plurality of functions. The functions may include receiving a bullish threshold, a bearish threshold, and one or more time periods from at least one user. The functions may further include receiving a plurality of predictions corresponding to at least one prediction user from one or more prediction databases, wherein each of the plurality of predictions includes a basis set identifier, a date, and a basis set prediction value. The functions may further include, based on the plurality of predictions, determining at least one p-score for each of the one or more time periods. The functions may further include receiving one or more basis sets from one or more databases. The functions may further include calculating a null distribution of successful predictions based on the one or more basis sets and the one or more time periods. The functions may further include determining a prediction user p-value based on the null distribution and the at least one p-score. The functions may further include selecting a classification for the at least one prediction user based on the prediction user p-value. The functions may further include displaying at least one graphical widget corresponding to the classification on one or more interfaces of a user device.

According to certain embodiments, a non-transitory computer-readable medium containing instructions for analyzing one or more user chance predictions to determine a user classification is disclosed. The instructions may include receiving a bullish threshold, a bearish threshold, and one or more time periods from at least one user. The instructions may further include receiving a plurality of predictions corresponding to at least one prediction user from one or more prediction databases, wherein each of the plurality of predictions includes a basis set identifier, a date, and a basis set prediction value. The instructions may further include, based on the plurality of predictions, determining at least one p-score for each of the one or more time periods. The instructions may further include receiving one or more basis sets from one or more databases. The instructions may further include calculating a null distribution of successful predictions based on the one or more basis sets and the one or more time periods. The instructions may further include determining a prediction user p-value based on the null distribution and the at least one p-score. The instructions may further include selecting a classification for the at least one prediction user based on the prediction user p-value. The instructions may further include displaying at least one graphical widget corresponding to the classification on one or more interfaces of a user device.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
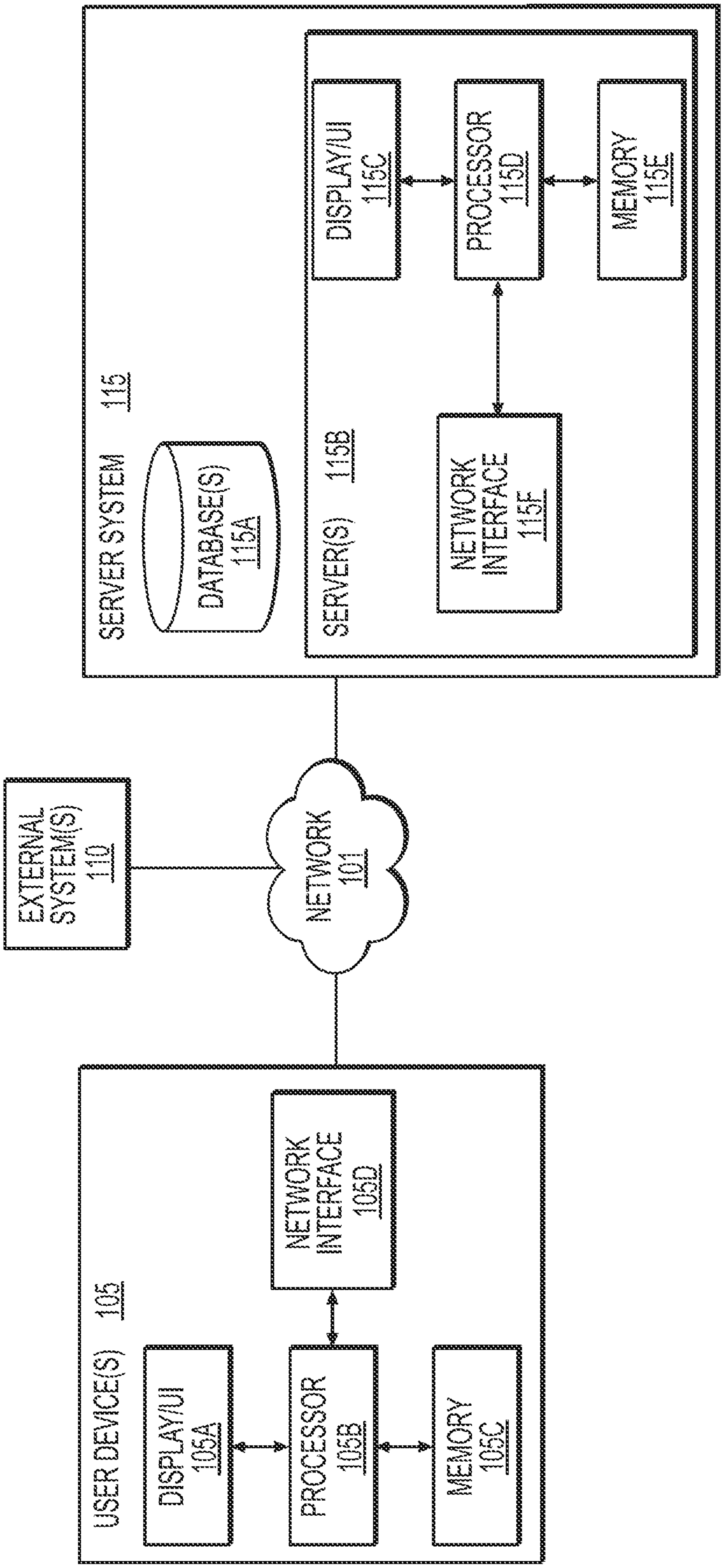
FIG. 1 depicts a schematic diagram illustrating an example environment implementing methods and systems of this disclosure, according to one or more embodiments.

According to certain aspects of the disclosure, methods and systems are disclosed for analyzing one or more user chance predictions to determine a user classification. Conventional techniques may not be suitable at least because conventional techniques, among other things, are unable to determine whether a user successfully made a prediction due to chance or the user's skill. Accordingly, improvements in technology relating to the process of analyzing one or more user chance predictions to determine a user classification are needed.

People have made predictions on everything from stocks to sports. As the use of the Internet continues to grow, especially regarding social media platforms and finance-oriented platforms, people are increasingly making and discussing predictions using such platforms. For example, users may weigh in on whether they are bullish on a stock (e.g., expecting the price to go up) or bearish (e.g., expecting the price to go down). Over time, users may accumulate successes and failures at making predictions. For example, users may accumulate successes and failures at predicting stock price movements on the social media platforms and/or the finance-oriented platforms. However, it is very difficult to assess a person's skill and success at making predictions. Conventional methods may include people manually researching whether a user's predictions have been successful. Additionally, conventional methods may rank users based on their predictions. However, conventional methods fail to determine whether a user successfully made a prediction due to chance or whether the user is actually skilled. Additionally, ranking the users may not be accurate, as ranking the users may be dependent on the set of users, which may change over time. As a result, people are unable to accurately determine which users to follow for insight regarding a particular prediction. Thus, improvements in assessing a user's skill in making predictions are needed.

This disclosure provides systems and methods for analyzing one or more user chance predictions to determine a user classification. The systems and methods may include receiving a bullish threshold, a bearish threshold, and one or more time periods from at least one user. The systems and methods may include receiving a plurality of predictions corresponding to at least one prediction user from one or more prediction databases, wherein each of the plurality of predictions includes a basis set identifier, a date, and a basis set prediction value. The systems and methods may include receiving one or more basis sets from one or more databases. The systems and methods may include, based on the plurality of predictions, determining at least one p-score for each of the one or more time periods. The systems and methods may include calculating a null distribution of successful predictions based on the one or more basis sets and the one or more time periods. The systems and methods may include determining a prediction user p-value based on the null distribution and the at least one p-score. The systems and methods may include selecting a classification for the at least one prediction user based on the prediction user p-value. The systems and methods may include displaying at least one graphical widget corresponding to the classification on one or more interfaces of a user device.

Advantages of such a system may include increasing the accuracy of identifying a skilled user by analyzing market conditions. For example, the system may analyze the user's predictions and/or bets and compare the user's performance against a null hypothesis that the user's performance may be no better than a chance selection. By way of further example, the null hypothesis may be that the user's stock predicting performance may be no better than a chance stock selection under market conditions that occur during the prediction. Additional advantages may include increasing user engagement with a platform by displaying widgets indicating a user's skill for making bets and/or predictions. Additional advantages may also include analyzing the data of successful users for additional analytics.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise. Additionally, as used herein, the terms "bet," "bets," "predict," "predicts," and "predictions" may be used interchangeably.

Exemplary Environment

FIG. 1 depicts an exemplary environment 100 that may be utilized with the techniques presented herein. One or more user device(s) 105, one or more external system(s) 110, and one or more server system(s) 115 may communicate across a network 101. As will be discussed in further detail below, one or more server system(s) 115 may communicate with one or more of the other components of the environment 100 across network 101. The one or more user device(s) 105 may be associated with a user.

In some embodiments, the components of the environment 100 are associated with a common entity. In some embodiments, one or more of the components of the environment is associated with a different entity than another. The systems and devices of the environment 100 may communicate in any arrangement.

The user device 105 may be configured to enable the user to access and/or interact with other systems in the environment 100. For example, the user device 105 may be a computer system such as, for example, a desktop computer, a mobile device, a tablet, etc. In some embodiments, the user device 105 may include one or more electronic application (s), e.g., a program, plugin, browser extension, etc., installed on a memory of the user device 105.

The user device 105 may include a display/user interface (UI) 105A, a processor 105B, a memory 105C, and/or a network interface 105D. The user device 105 may execute, by the processor 105B, an operating system (O/S) and at least one electronic application (each stored in memory 105C). The electronic application may be a desktop program, a browser program, a web client, or a mobile application program (which may also be a browser program in a mobile O/S), an applicant specific program, system control software, system monitoring software, software development tools, or the like. For example, environment 100 may extend information on a web client that may be accessed through a web browser. In some embodiments, the electronic application(s) may be associated with one or more of the other components in the environment 100. The application may manage the memory 105C, such as a database, to transmit streaming data to network 101. The display/UI 105A may be a touch screen or a display with other input systems (e.g., mouse, keyboard, etc.) so that the user(s) may interact with the application and/or the O/S. The network interface 105D may be a TCP/IP network interface for, e.g., Ethernet or wireless communications with the network 101. The processor 105B, while executing the application, may generate data and/or receive user inputs from the display/UI 105A and/or receive/transmit messages to the server system 115, and may further perform one or more operations prior to providing an output to the network 101.

External systems 110 may be, for example, one or more third party and/or auxiliary systems that integrate and/or communicate with the server system 115 in performing various chance prediction tasks. External systems 110 may be in communication with other device(s) or system(s) in the environment 100 over the one or more networks 101. For example, external systems 110 may communicate with the server system 115 via API (application programming interface) access over the one or more networks 101, and also communicate with the user device(s) 105 via web browser access over the one or more networks 101.

In various embodiments, the network 101 may be a wide area network ("WAN"), a local area network ("LAN"), a personal area network ("PAN"), or the like. In some embodiments, network 101 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The server system 115 may include an electronic data system, e.g., a computer-readable memory such as a hard drive, flash drive, disk, etc. In some embodiments, the server system 115 includes and/or interacts with an application programming interface for exchanging data to other systems, e.g., one or more of the other components of the environment.

The server system 115 may include a database 115A and at least one server 115B. The server system 115 may be a computer, system of computers (e.g., rack server(s)), and/or or a cloud service computer system. The server system may store or have access to database 115A (e.g., hosted on a third party server or in memory 115E). The server(s) may include a display/UI 115C, a processor 115D, a memory 115E, and/or a network interface 115F. The display/UI 115C may be a touch screen or a display with other input systems (e.g., mouse, keyboard, etc.) for an operator of the server 115B to control the functions of the server 115B. The server system 115 may execute, by the processor 115D, an operating system (O/S) and at least one instance of a servlet program (each stored in memory 115E).

In the methods below, various acts may be described as performed or executed by a component from FIG. 1, such as the server system 115, the user device 105, or components thereof. However, it should be understood that in various embodiments, various components of the environment 100 discussed above may execute instructions or perform acts including the acts discussed above and below. An act performed by a device may be considered to be performed by a processor, actuator, or the like associated with that device. Further, it should be understood that in various embodiments, various steps may be added, omitted, and/or rearranged in any suitable manner.

Figure 2:
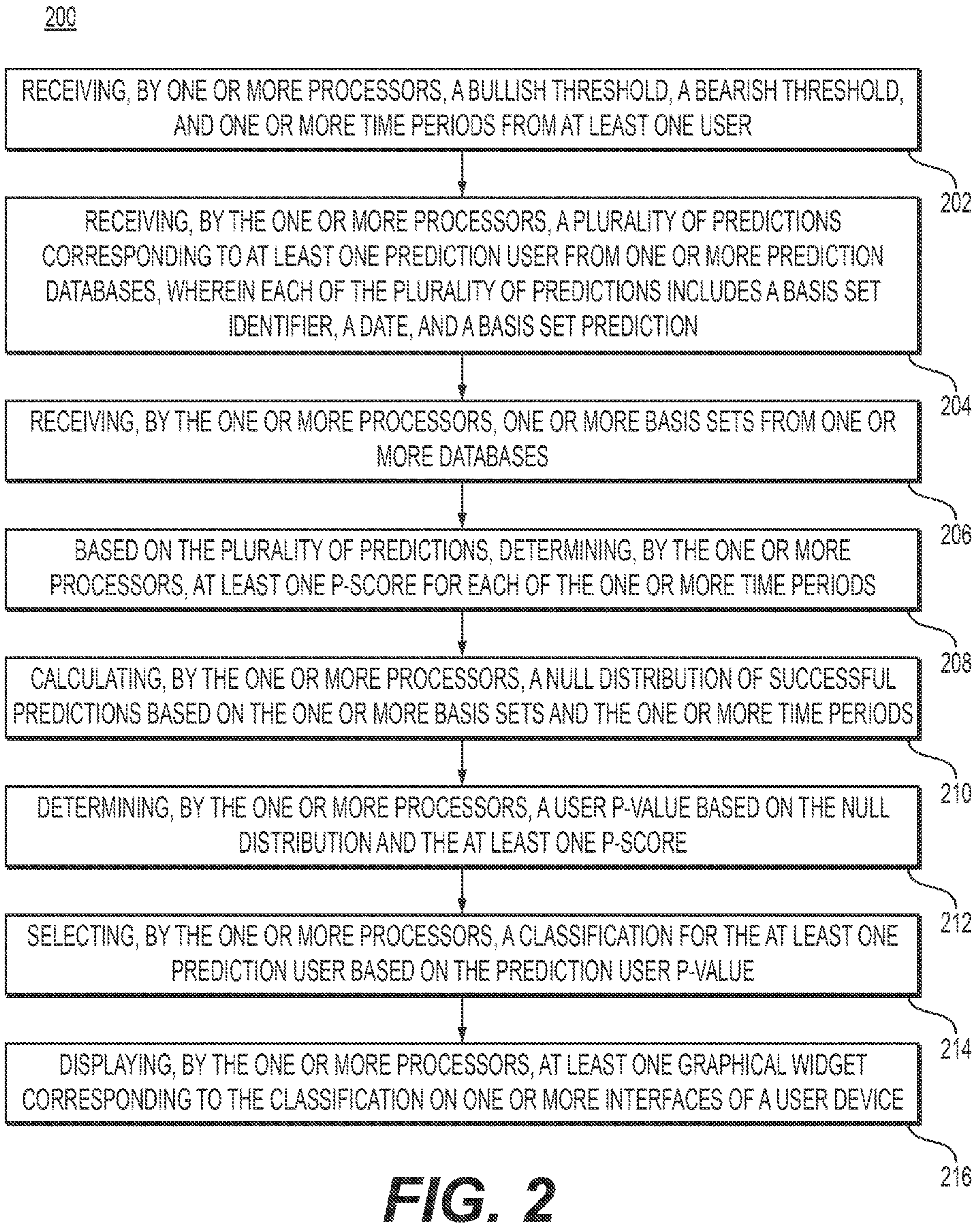
FIG. 2 depicts a flow diagram of an exemplary method for analyzing one or more user chance predictions to determine a user classification, according to one or more embodiments.

In general, any process or operation discussed in this disclosure that is understood to be computer-implementable, such as the processes illustrated in FIG. 2, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Although depicted as separate components in FIG. 1, it should be understood that a component or portion of a component in the environment 100 may, in some embodiments, be integrated with or incorporated into one or more other components. For example, a portion of the display 115C may be integrated into the user device 105 or the like. In some embodiments, operations or aspects of one or more of the components discussed above may be distributed amongst one or more other components. Any suitable arrangement and/or integration of the various systems and devices of the environment 100 may be used.

Exemplary Method for Analyzing One or More User Chance Predictions

FIG. 2 depicts a flow diagram of an exemplary method 200 for analyzing one or more user chance predictions determine a user classification, according to one or more embodiments. Notably, method 200 may be performed by one or more processors of a server that is in communication with one or more user devices and other external system(s) via a network. However, it should be noted that method 200 may be performed by any one or more of the server, one or more user devices, or other external systems. Exemplary method 200 may be executed on one or more components of FIG. 1 or 5.

The method may include receiving, by one or more processors, a bullish threshold, a bearish threshold, and one or more time periods from at least one user (Step 202). The bullish threshold may correspond to a threshold value (e.g., a ratio or a price) over which a basis set value is considered a correct bullish prediction. For example, if a sock has a price that increases over a bullish threshold value, the stock may be considered to have a correct bullish prediction. In some embodiments, the bullish threshold may include a threshold value and a threshold timeframe. For example, the bullish threshold may include a 5 percent increase over three days, where the "5 percent increase" may correspond to a threshold value and the "three days" may correspond to the threshold timeframe. In some embodiments, the bullish threshold may have a default value, unless a user provides a bullish threshold to override the default value. The bearish threshold may correspond to a threshold value (e.g., a price) over which a down movement is considered a correct bearish prediction. For example, if a stock has a price that decreases over a bearish threshold value, the stock may be considered to have a correct bearish prediction. In some embodiments, the bearish threshold may include a threshold value and a threshold timeframe. For example, the bearish threshold may include a 3 percent decrease over two days, where the "3 percent decrease" may correspond to a threshold value and the "two days" may correspond to the threshold timeframe. In some embodiments, the bearish threshold may have a default value, unless a user provides a bearish threshold to override the default value. The one or more time periods may correspond to a particular time frame (e.g., three hours) and/or frequency (e.g., for four days) to assess if a prediction is successful or not. In some embodiments, the time periods may include a default time period unless a time period is received from the user to override the default time period. The user may input the bullish threshold, the bearish threshold, and/or the time periods via a user interface of a user device. Additionally, or alternatively, the system may retrieve the bullish threshold, the bearish threshold, and/or the time periods from one or more internal and/or external systems.

The method may further include receiving, by the one or more processors, a plurality of predictions corresponding to at least one prediction user from one or more prediction databases, wherein each of the plurality of predictions includes a basis set identifier, a date, and a basis set prediction value (Step 204). The predictions may have been previously stored in one or more prediction databases. The prediction databases may receive the predictions from one or more social media platforms. In some embodiments, the system may receive the predictions from the social media platforms, in addition to receiving some predictions from the prediction databases. The predictions may be a subset of all predictions made by the prediction user. For example, the subset may correspond to predictions that were made during a particular period of time. In some embodiments, the user may specify the one or more time frames for the subset. Additionally, or alternatively, the subset may corresponded to a predefined range (e.g., the past week, the past 24 hours).

Each prediction may correspond to a basis set, where each prediction includes a basis set identifier, a date, and a basis set prediction value. For example, each prediction may correspond to a particular stock. The basis set identifier may correspond to a unique identifier. For example, the basis set identifier may correspond to a particular unique stock identifier. The date may correspond to a particular date and/or time that the prediction user made the prediction. The basis set prediction value may include at least one bullish prediction or at least one bearish prediction. The bullish prediction may include at least one keyword (e.g., "bullish") and/or at least one comment from the prediction user. The bearish prediction may include at least one keyword (e.g., "bearish") and/or at least one comment from the prediction user. In some embodiments, the at least one bullish prediction or the at least one bearish prediction may be expressed as a ratio (e.g., a percentage). In some embodiments, the basis set prediction value may be expressed as a value instead of, or in addition to, the at least one keyword.

In some embodiments, the method may further include refining, by the one or more processors, the plurality of predictions for each of the at least one prediction user, the refining including removing at least one redundant predication from the plurality of predictions, wherein the at least one redundant prediction includes a similar basis set identifier and a similar date that is similar to at least one other prediction of the plurality of predictions for the at least one prediction user. For example, a user may make more than one prediction for the same stock during the same time period. As a result, the refining may remove duplicate predictions. Additionally, or alternatively, the method may further include further refining, by the one or more processors, the plurality of predictions by a basis set type. For example, the predictions may be filtered by one or more stock types.

The method may further include receiving, by the one or more processors, one or more basis sets from one or more databases (Step 206). The one or more basis sets may correspond to one or more investments. For example, the basis sets may correspond to stocks. Additionally, or alternatively, the basis sets may correspond to other types of investments, such as options, bonds, cryptocurrencies, real estate, art, and the like. The one or more databases may belong to an external system and/or an internal system. The databases may store the basis sets in real-time, where the databases may be continually updated with the basis sets and current values of the basis sets. For example, the databases may store stock information in real-time, where the databases may be continually updated with the most current stock information. The databases may include one or more records, where each record may correspond to an individual stock. The record may store a unique stock identifier, a stock value, and/or a timestamp reflecting when the stock information was last updated.

In some embodiments, the method may further include, for each of the one or more time periods, determining, by the one or more processors, a basis set bullish comparison value corresponding to the one or more basis sets that have a higher value than the bullish threshold. The basis set bullish comparison value may correspond to the percentage of basis sets that have a value higher than the bullish threshold. For example, the basis set bullish comparison value may correspond to the percentage of stocks that went up in price by more than the bullish threshold. For example, each stock of a plurality of stocks may be analyzed to determine whether the stock timestamp falls within the time period. The stocks that fall within the time period may be further analyzed to determine the percentage of such stocks that have a higher value than the bullish threshold. The method may further include recording, by the one or more processors, the basis set bullish comparison value as the p-bullish score for the corresponding one or more time periods. For example, the percentage of stocks that have a higher value than the bullish threshold may be recorded in one or more databases of an internal and/or external system as the basis set bullish comparison value.

In some embodiments, the method may further include, for each of the one or more time periods, determining, by the one or more processors, a basis set bearish comparison value corresponding to the one or more basis sets that have a lower value than the bearish threshold. The basis set bearish comparison value may correspond to the percentage of basis sets that have a value lower than the bearish threshold. For example, the basis set bearish comparison value may correspond to the percentage of stocks that went down in price by less than the bearish threshold. For example, each stock of a plurality of stocks may be analyzed to determine whether the stock timestamp falls within the time period. The stocks that fall within the time period may be further analyzed to determine the percentage of such stocks that have a lower value than the bearish threshold. The method may further include recording, by the one or more processors, the basis set bearish comparison value as the p-bearish score for the corresponding one or more time periods. For example, the percentage of stocks that have a lower value than the bearish threshold may be recorded in one or more databases of an internal and/or external system as the basis set bearish comparison value.

The p-bullish and p-bearish values may be used to set a value for a variant of the binomial test (discussed below). The binomial test may be used to calculate the probability of a certain number of successes in a certain number of trials, given a set probability of either a success or failure. The p-bullish or the p-bearish value may reflect a chance of success for each trial.

The method may further include, based on the plurality of predictions, determining, by the one or more processors, at least one p-score for each of the one or more time periods (Step 208). The at least one p-score may include a list of p-score entries, where each p-score entry corresponds to a time period of the one or more time periods. In some embodiments, the at least one p-score may include a p-bullish score and a p-bearish score for each of the one or more time periods. In other embodiments, the at least one p-score may include one score for each of the one or more time periods. Additionally, for example, the system may calculate the percentage of stocks that went down in value by more than the bearish threshold during a time period, and then record that percentage as the p-bearish score for the time period. Additionally, the at least one p-score may correspond to the p chance of success of an individual prediction.

In some embodiments, any of the previously stored p-scores may be cleared to reset the p-scores prior to determining the at least one p-score.

The determining the at least one p-score may include, for each of the plurality of predictions, comparing, by the one or more processors, each of the plurality of predictions to the bullish threshold. The comparing may include analyzing each prediction to determine whether the prediction (e.g., the basis set prediction value) meets or surpasses the bullish threshold. In some embodiments, the keyword and/or value of each basis set prediction value may be analyzed to determine whether the keyword and/or value meets or surpasses the bullish threshold. For example, the comparing may include analyzing each basis set prediction value that includes the keyword "bullish" to determine whether the basis set was actually bullish. Additionally, or alternatively, the comparing may include analyzing the keyword (e.g., "bullish") and the corresponding basis prediction value to determine whether the basis set was actually bullish. For example, a stock prediction may include the keyword "bullish" and a stock prediction value that the stock will go up over 5 percent in three days. The bullish threshold may include that a bullish stock will go up over 6 percent in three days. As a result, the system may determine that the stock prediction surpassed the bullish threshold.

Additionally, determining the p-score may also include, in response to determining that the prediction of the plurality of predictions is above the bullish threshold, determining, by the one or more processors, the p-bullish score for the one or more time periods and appending the p-bullish score to the at least one p-score for the corresponding time period. In some embodiments, determining the p-bullish score may include determining a value of the number of predictions that correctly predicted that the basis set was bullish for the time period. For example, all of the stock predictions that use the keyword "bullish" may be analyzed, where the p-bullish score includes a percentage of the "bullish" stock predictions that correctly predicted that the stock was bullish. In some embodiments, the p-bullish score may be determined by a user's intent (e.g., the sentiment in a comment or marking a social media post as bullish/bearish), a test threshold (i.e., what level of performance is required for a stock), and/or the percentage of stocks that passed the test threshold from the time of the user's prediction to the end of the test period. For example, regarding the test threshold, the test threshold may include users who are successful in identifying one or more stocks that increase in value by more than 5% in a month. The system may then append the p-bullish score to the at least one p-score for the corresponding time period. Additionally, appending the p-bullish score to the at least one p-score may include updating the p-bullish score in one or more databases for the corresponding time period to include the appended p-bullish score.

Additionally, or alternatively, the determining the at least one p-score may include, for each of the plurality of predictions, comparing, by the one or more processors, each of the plurality of predictions to the bearish threshold. The comparing may include analyzing each prediction to determine whether the prediction (e.g., the basis set prediction value) does not meet or surpass the bearish threshold. In some embodiments, the keyword and/or value of each basis set prediction value may be analyzed to determine whether the keyword and/or value does not meet or surpass the bearish threshold. For example, the comparing may include analyzing each basis set prediction value that includes the keyword "bearish" to determine whether the basis set was actually bearish. Additionally, or alternatively, the comparing may include analyzing the keyword (e.g., "bearish") and the corresponding basis prediction value to determine whether the basis set was actually bearish. For example, a stock prediction may include the keyword "bearish" and a stock prediction value that the stock will not surpass 3 percent in two days. The bearish threshold may include that a bearish stock will not surpass 4 percent in two days. As a result, the system may determine that the stock prediction did not surpass the bullish threshold.

Additionally, determining the p-score may include, in response to determining that the prediction of the plurality of predictions is below the bearish threshold, determining, by the one or more processors, the p-bearish score for the one or more time periods and appending the p-bearish score to the at least one p-score. In some embodiments, determining the p-bearish score may include determining a value of the number of predictions that correctly predicted that the basis set was bearish for the time period. For example, all of the stock predictions that use the keyword "bearish" may be analyzed, where the p-bearish score may include a percentage of the "bearish" stock predictions that correctly predicted that the stock was bearish. The system may then append the p-bearish score to the at least one p-score for the corresponding time period. Additionally, appending the p-bearish score to the at least one p-score may include updating the p-bearish score in one or more databases for the corresponding time period to include the appended p-bearish score.

The method may further include calculating, by the one or more processors, a null distribution of successful predictions based on the one or more basis sets and the one or more time periods (Step 210). The null distribution may include the probability of each number of successful random predictions that match the one or more predictions. The random predictions may include one or more random basis sets. In some embodiments, the null distribution computation (using dynamic programming) may be as follows:

Let the list of p-scores be p[1], . . . , p[n].

Assign d[0]=1 and d[1]= . . . =d[n]=0.

For i from 1 to n:

For j from i down to 1: Assign d[j]=(1.0–p[i])*d[j]+p[i]*d[j–1]

Assign d[0]=(1.0–p[i])*d[0]

After such a process, for each k in 0 to n, d[k] may be the probability that the chance selection yields k successes.

In some embodiments, the following binomial test, which is a more specific version of the previous algorithm, may be used. The binomial test may assume that the probability of success may be the same for each trial, while the algorithm may allow for different chances of success for each trial.

Chance of k successes in n bets given p chance of success in individual bet:

$$f(k, n, p) = Pr(k; n, p) = Pr(X = k) = \binom{n}{k} p^k (1 - p)^{n-k}$$

p-val: chance of >=k successes in n bets given p chance of success in individual bet:

$$\sum_{i=k}^{n} f(i, n, p)$$

For example, the chance of a prediction user being correct with zero predictions may be 100 percent. The chance of a prediction user being correct with one prediction may be the p-score. The chance of a prediction user being correct with two predictions may be the multiplication of the two p-scores.

The method may include determining, by the one or more processors, a prediction user p-value based on the null distribution and the at least one p-score (Step 212). The prediction user p-value may indicate the chance that the prediction user's prediction was randomly correct. For example, a p-value of 1 percent may indicate that the prediction user may be skilled, not just lucky. However, a p-value of 5 percent may indicate that the prediction user may have been lucky.

The prediction user p-value may be computed as d[k]+ . . . +d[n], where k may be the number of successful predictions made by the user:

The method may include selecting, by the one or more processors, a classification for the at least one prediction user based on the prediction user p-value (Step 214). The selecting may include comparing the prediction user p-value to a p-value threshold. The p-value threshold may have been provided by a user and/or an internal system or an external system. The p-value threshold may correspond to a threshold for determining a prediction user's skill. After determining the p-value, the system may compare the p-value to a p-value threshold. If the p-value meets or surpasses the p-value threshold, the system may classify the prediction user as not skilled. However, if the p-value is below the p-value threshold, the system may classify the user as skilled. For example, if a prediction user's p-value is 1 percent, the prediction user may be classified as "skilled." If a prediction user p-value is 5 percent, the prediction user may be classified as "not skilled."

In some embodiments, the method may include determining, by the one or more processors, at least one low p-value that is lower than a p-value threshold. Additionally, the method may also include flagging, by the one or more processors, the at least one prediction user that corresponds to the at least one low p-value. For example, the one or more databases may store a flag in the database record corresponding to the prediction user.

The classification may correspond to statistically significant sets of predictions over different basis sets. Example classifications may include one or more of the following: Market Expert (a general badge for the performance in a market—e.g., S&P 500 stocks, NYSE stocks, and the like), Home Run Hitter (good at spotting the big jumps (e.g., a low p-value with a high gains threshold)), Steady Hand (good at making steady gains (e.g., statistically significant performance with a low gains threshold and a low loss threshold)), Maverick (great with investments that are getting fewer predictions from other users), Iconoclast (great with going against the predictions of the crowd), Long-Hauler (great at predicting over a long time period), Fast Twitcher (great at predicting over a short time period), Bull (statistically significant performance over bull predictions), Bear (statistically significant performance over bear predictions), and/or Sector Expert (great at predicting in a sector).

The method may include displaying, by the one or more processors, at least one graphical widget corresponding to the classification on one or more interfaces of a user device (Step 216). For example, if a user has a "skilled" classification, the user interface may display a graphical widget that includes "skilled." In some embodiments, the graphical widget may include a recommendation to follow the predication user on one or more social media platforms. In other embodiments, the graphical widget may include a recommendation to unfollow a prediction user on one or more social media platforms (e.g., when the user no longer has a "skilled" classification).

Although FIG. 2 shows example blocks of exemplary method 200, in some implementations, the exemplary method 200 may include additional blocks, fewer blocks, different blocks, or differently arranged blocks than those depicted in FIG. 2 Additionally, or alternatively, two or more of the blocks of the exemplary method 200 may be performed in parallel.

Exemplary Method for Model Evaluation and Selection

Figures 3, 4:
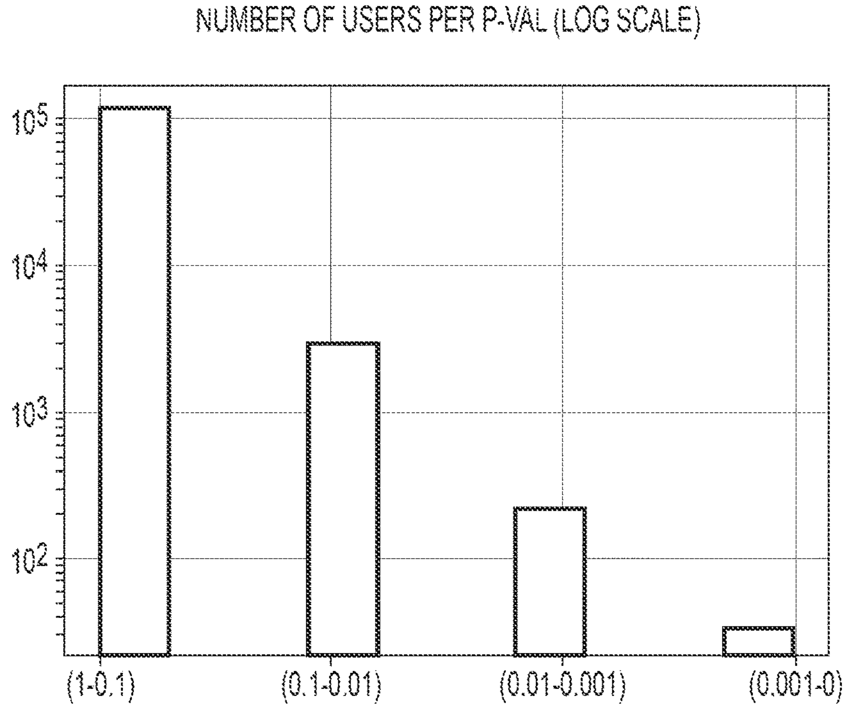
FIG. 3 depicts a schematic diagram of an exemplary embodiment of users per p-val, according to one or more embodiments.
FIG. 4 depicts a schematic diagram of an exemplary embodiment of significant and non-significant user predictions, according to one or more embodiments.

FIG. 3 depicts a schematic diagram of an exemplary embodiment of users per p-val, according to one or more embodiments. For example, the diagram illustrates the number of users per p-val on a logarithmic scale.

FIG. 4 depicts a schematic diagram of an exemplary embodiment of significant and non-significant user predictions, according to one or more embodiments. For example, the diagram displays significant successful predictions and non-significant successful predictions.

Exemplary Computer System

Figure 5:
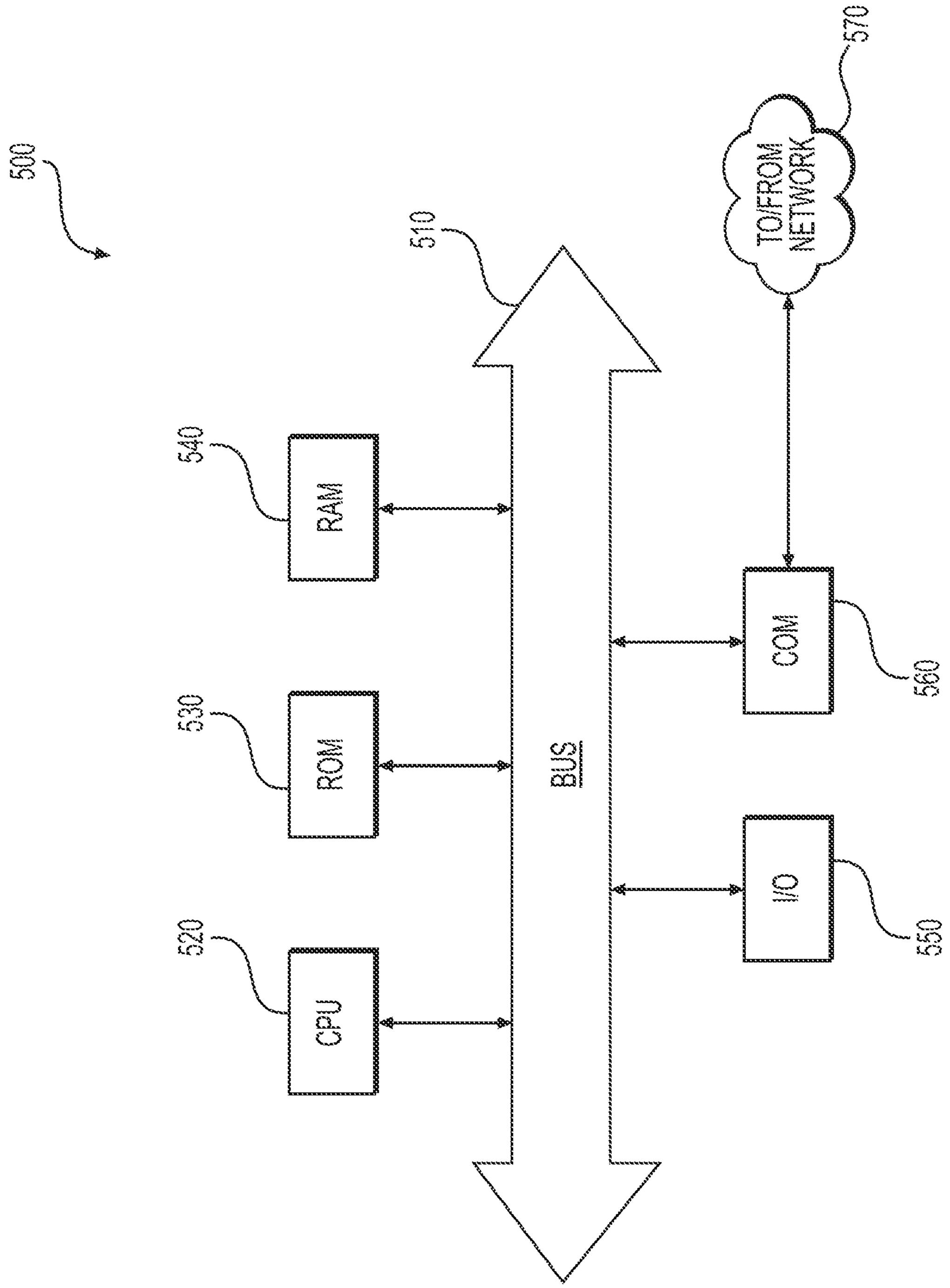
FIG. 5 depicts an example system that may execute techniques presented herein.

FIG. 5 illustrates a high-level functional block diagram of an exemplary computer system 500, in which embodiments of the present disclosure, or portions thereof, may be implemented, e.g., as computer-readable code. For example, each of the exemplary devices and systems described above with respect to FIG. 5 can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIG. 5, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-4 may be implemented using computer system 500, shown in FIG. 5. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

FIG. 5 provides a functional block diagram illustration of general purpose computer hardware platforms. FIG. 5 illustrates a network or host computer platform 500, as may typically be used to implement a server, such as user device(s) 105, external system(s) 110, and server system 115. It is believed that those skilled in the art are familiar with the structure, programming, and general operation of such computer equipment and, as a result, the drawings should be self-explanatory.

A platform for a server or the like 500, for example, may include a data communication interface for packet data communication 560. The platform may also include a central processing unit (CPU) 520, in the form of one or more processors, for executing program instructions. The platform typically includes an internal communication bus 510, program storage, and data storage for various data files to be processed and/or communicated by the platform such as ROM 530 and RAM 540, although the computer platform 500 often receives programming and data via network communications 570. The hardware elements, operating systems, and programming languages of such equipment are conventional in nature, and it is presumed that those skilled in the art are adequately familiar therewith. The computer platform 500 also may include input and output ports 550 to connect with input and output devices such as keyboards, mice, touchscreens, monitors, displays, etc. Of course, the various computer platform functions may be implemented in a distributed fashion on a number of similar platforms, to distribute the processing load. Alternatively, the computer platforms may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as those used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage"

media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for analyzing one or more user chance predictions to determine a user classification, the method comprising:

receiving, by one or more processors, a bullish threshold, a bearish threshold, social media data, and one or more time periods from at least one user;

receiving, by the one or more processors, a plurality of predictions corresponding to at least one prediction user from one or more prediction databases, wherein each of the plurality of predictions includes a basis set identifier, a date, and a basis set prediction value;

receiving, by the one or more processors, one or more basis sets from one or more databases;

determining, by the one or more processors, a user sentiment based on the social media data;

based on the plurality of predictions and the user sentiment, determining, by the one or more processors, at least one p-score for each of the one or more time periods;

calculating, by the one or more processors, a null distribution of successful predictions based on the one or more basis sets and the one or more time periods;

determining, by the one or more processors, a prediction user p-value based on the null distribution and the at least one p-score;

selecting, by the one or more processors, a classification for the at least one prediction user based on the prediction user p-value; and displaying, by the one or more processors, at least one graphical widget corresponding to the classification on one or more interfaces of a user device, the at least one graphical widget including a recommendation to follow or unfollow a social media platform of the prediction user.

2. The computer-implemented method of claim 1, wherein the at least one p-score includes a p-bullish score and a p-bearish score for each of the one or more time periods.

3. The computer-implemented method of claim 2, the method further comprising:

for each of the one or more time periods, determining, by the one or more processors, a basis set bullish comparison value corresponding to the one or more basis sets that have a higher value than the bullish threshold; and recording, by the one or more processors, the basis set bullish comparison value as the p-bullish score for the corresponding one or more time periods.

4. The computer-implemented method of claim 2, the method further comprising:

for each of the one or more time periods, determining, by the one or more processors, a basis set bearish comparison value corresponding to the one or more basis sets that have a lower value than the bearish threshold; and recording, by the one or more processors, the basis set bearish comparison value as the p-bearish score for the corresponding one or more time periods.

5. The computer-implemented method of claim 2, wherein determining the at least one p-score for each of the one or more time periods further comprises:

for each of the plurality of predictions, comparing, by the one or more processors, each of the plurality of predictions to the bullish threshold; and in response to determining that the prediction of the plurality of predictions is above the bullish threshold, determining, by the one or more processors, the p-bullish score for the one or more time periods and appending the p-bullish score to the at least one p-score for the corresponding time period.

6. The computer-implemented method of claim 2, wherein determining the at least one p-score for each of the one or more time periods further comprises:

for each of the plurality of predictions, comparing, by the one or more processors, each of the plurality of predictions to the bearish threshold; and in response to determining that the prediction of the plurality of predictions is below the bearish threshold, determining, by the one or more processors, the p-bearish score for the one or more time periods and appending the p-bearish score to the at least one p-score for the corresponding time period.

7. The computer-implemented method of claim 1, wherein the basis set prediction value includes at least one bullish prediction or at least one bearish prediction.

8. The computer-implemented method of claim 7, wherein the at least one bullish prediction or the at least one bearish prediction is expressed as a ratio.

9. The computer-implemented method of claim 1, the method further comprising:

refining, by the one or more processors, the plurality of predictions for each of the at least one prediction user, the refining including removing at least one redundant predication from the plurality of predictions, wherein the at least one redundant prediction includes a similar basis set identifier and a similar date that is similar to at least one other prediction of the plurality of predictions for the at least one prediction user.

10. The computer-implemented method of claim 9, the method further comprising:

further refining, by the one or more processors, the plurality of predictions by a basis set type.

11. The computer-implemented method of claim 1, the method further comprising:

determining, by the one or more processors, at least one low p-value that is lower than a p-value threshold; and flagging, by the one or more processors, the at least one prediction user that corresponds to the at least one low p-value.

12. A computer system for analyzing one or more user chance predictions to determine a user classification, the computer system comprising:

a memory having processor-readable instructions stored therein; and one or more processors configured to access the memory and execute the processor-readable instructions, which when executed by the one or more processors configures the one or more processors to perform a plurality of functions, including functions for:

receiving a bullish threshold, a bearish threshold, social media data, and one or more time periods from at least one user;

receiving a plurality of predictions corresponding to at least one prediction user from one or more prediction databases, wherein each of the plurality of predictions includes a basis set identifier, a date, and a basis set prediction value;

determining, by the one or more processors, a user sentiment based on the social media data;

based on the plurality of predictions and the user sentiment, determining at least one p-score for each of the one or more time periods;

receiving one or more basis sets from one or more databases;

calculating a null distribution of successful predictions based on the one or more basis sets and the one or more time periods;

determining a prediction user p-value based on the null distribution and the at least one p-score;

selecting a classification for the at least one prediction user based on the prediction user p-value; and displaying at least one graphical widget corresponding to the classification on one or more interfaces of a user device, the at least one graphical widget including a recommendation to follow or unfollow a social media platform of the prediction user.

13. The computer system of claim 12, wherein the at least one p-score includes a p-bullish score and a p-bearish score for each of the one or more time periods.

14. The computer system of claim 13, the functions further comprising:

for each of the one or more time periods, determining a basis set bullish comparison value corresponding to the one or more basis sets that have a higher value than the bullish threshold; and recording the basis set bullish comparison value as the p-bullish score for the corresponding one or more time periods.

15. The computer system of claim 13, the functions further comprising:

for each of the one or more time periods, determining a basis set bearish comparison value corresponding to the one or more basis sets that have a lower value than the bearish threshold; and recording the basis set comparison value as the p-bearish score for the corresponding one or more time periods.

16. The computer system of claim 12, the functions further comprising:

refining the plurality of predictions for each of the at least one prediction user, the refining including removing at least one redundant predication from the plurality of predictions, wherein the at least one redundant prediction includes a similar basis set identifier and a similar date that is similar to at least one other prediction of the plurality of predictions for the at least one prediction user.

17. A non-transitory computer-readable medium containing instructions for analyzing one or more user chance predictions to determine a user classification, the instructions comprising:

receiving a bullish threshold, a bearish threshold, social media data, and one or more time periods from at least one user;

receiving a plurality of predictions corresponding to at least one prediction user from one or more prediction databases, wherein each of the plurality of predictions includes a basis set identifier, a date, and a basis set prediction value;

determining a user sentiment based on the social media data;

based on the plurality of predictions and the user sentiment, determining at least one p-score for each of the one or more time periods;

receiving one or more basis sets from one or more databases;

calculating a null distribution of successful predictions based on the one or more basis sets and the one or more time periods;

determining a prediction user p-value based on the null distribution and the at least one p-score;

selecting a classification for the at least one prediction user based on the prediction user p-value; and displaying at least one graphical widget corresponding to the classification on one or more interfaces of a user device, the at least one graphical widget including a recommendation to follow or unfollow a social media platform of the prediction user.

18. The non-transitory computer-readable medium of claim 17, wherein the at least one p-score includes a p-bullish score and a p-bearish score for each of the one or more time periods.

19. The non-transitory computer-readable medium of claim 18, the instructions further comprising:

for each of the one or more time periods, determining a basis set bullish comparison value corresponding to the one or more basis sets that have a higher value than the bullish threshold; and recording the basis set bullish comparison value as the p-bullish score for the corresponding one or more time periods.

20. The non-transitory computer-readable medium of claim 18, the instructions further comprising:

for each of the one or more time periods, determining a basis set bearish comparison value corresponding to the one or more basis sets that have a lower value than the bearish threshold; and recording the basis set bearish comparison value as the p-bearish score for the corresponding one or more time periods.

* * * * *